(12) United States Patent
Mihai

(10) Patent No.: US 12,339,892 B2
(45) Date of Patent: *Jun. 24, 2025

(54) SYSTEMS AND METHODS FOR GENERATING METADATA ASSOCIATED WITH LEARNING RESOURCES

(71) Applicant: D2L Corporation, Kitchener (CA)

(72) Inventor: Sebastian Mihai, Kitchener (CA)

(73) Assignee: D2L Corporation, Kitchener (CA)

( * ) Notice: Subject to any disclaimer, the term of this patent is extended or adjusted under 35 U.S.C. 154(b) by 12 days.

This patent is subject to a terminal disclaimer.

(21) Appl. No.: 18/225,740

(22) Filed: Jul. 25, 2023

(65) Prior Publication Data

US 2024/0095271 A1    Mar. 21, 2024

Related U.S. Application Data

(63) Continuation of application No. 14/208,505, filed on Mar. 13, 2014, now Pat. No. 11,748,396.

(51) Int. Cl.
*G06F 17/00* (2019.01)
*G06F 16/38* (2019.01)
*G09B 5/00* (2006.01)

(52) U.S. Cl.
CPC ............... *G06F 16/38* (2019.01); *G09B 5/00* (2013.01)

(58) Field of Classification Search
CPC .................... G06F 16/38; G09B 5/00
See application file for complete search history.

(56) References Cited

U.S. PATENT DOCUMENTS

| | | | |
|---|---|---|---|
| 5,983,277 A | | 11/1999 | Heile et al. |
| 6,149,441 A | * | 11/2000 | Pellegrino ................ G09B 7/02 434/350 |
| 9,576,494 B2 | | 2/2017 | Vattikonda et al. |
| 9,881,307 B2 | | 1/2018 | Kapoor |

(Continued)

OTHER PUBLICATIONS

Marek Meyer, Christoph Rensing, and Ralf Steinmetz. 2011. Multigranularity reuse of learning resources. ACM Trans. Multimedia Comput. Commun. Appl. 7, 1, Article 1, 23 pages, Jan. 2011.

(Continued)

*Primary Examiner* — Greta L Robinson
(74) *Attorney, Agent, or Firm* — SMART & BIGGAR LP; Jason B. Hynes

(57) ABSTRACT

Systems and methods for generating metadata for at least one learning resource are provided. The system includes at least one data storage device storing a plurality of predefined metadata templates, each of the metadata templates having a plurality of metadata fields and a processor in data communication with the at least one data storage device. The processor is configured to receive the at least one learning resource, the at least one learning resource including an electronic file having a learning resource type and content data, select a metadata template from the predefined metadata templates based upon the learning resource type of the at least one learning resource, determine a topic associated with the learning resource, and customize the selected metadata template by adding one or more predefined metadata fields associated with the topic of the learning resource.

20 Claims, 6 Drawing Sheets

(56) References Cited

U.S. PATENT DOCUMENTS

| | | | |
|---|---|---|---|
| 11,748,396 B2* | 9/2023 | Mihai | G06F 16/38 707/803 |
| 12,067,901 B2* | 8/2024 | Bilic | G09B 5/02 |
| 2003/0154381 A1 | 8/2003 | Ouye et al. | |
| 2004/0070613 A1 | 4/2004 | Sprague et al. | |
| 2005/0074022 A1 | 4/2005 | Kato et al. | |
| 2007/0061720 A1 | 3/2007 | Kriger | |
| 2007/0099161 A1* | 5/2007 | Krebs | G09B 7/00 434/362 |
| 2007/0168315 A1 | 7/2007 | Covannon et al. | |
| 2007/0196808 A1 | 8/2007 | Call | |
| 2008/0168365 A1 | 7/2008 | Chaudhri | |
| 2008/0288485 A1 | 11/2008 | Lager et al. | |
| 2009/0031215 A1 | 1/2009 | Collier, II et al. | |
| 2010/0094814 A1 | 4/2010 | Levy | |
| 2011/0039245 A1 | 2/2011 | Packard et al. | |
| 2011/0137910 A1 | 6/2011 | Hibino et al. | |
| 2011/0173225 A1 | 7/2011 | Stahl et al. | |
| 2012/0244506 A1 | 9/2012 | Lang et al. | |
| 2012/0276516 A1 | 11/2012 | Teskey et al. | |
| 2012/0322041 A1 | 12/2012 | Weisman | |
| 2013/0157242 A1 | 6/2013 | Leonardo et al. | |
| 2013/0166603 A1 | 6/2013 | Said et al. | |
| 2014/0115471 A1 | 4/2014 | Demkin et al. | |
| 2015/0213723 A1 | 7/2015 | Vattikonda et al. | |

OTHER PUBLICATIONS

Jake Wires and Michael J. Feeley 2007. Secure file system versioning at the block level. In Proceedings of the 2nd ACM SIGOPS/ EuroSys European Conference on Computer Systems, Association for Computing Machinery, 203-215. DOI:https://doi.org/10.1145/ 1272996.1273018, June (Year: 2007).

* cited by examiner

SYSTEMS AND METHODS FOR GENERATING METADATA ASSOCIATED WITH LEARNING RESOURCES

CROSS-REFERENCE TO RELATED APPLICATIONS

This application is a continuation of U.S. patent application Ser. No. 14/208,505, filed Mar. 13, 2014, the contents of which is hereby incorporated by reference herein, for all purposes.

TECHNICAL FIELD

The embodiments described herein relate to electronic learning systems, and in particular to systems and methods for generating metadata associated with learning resources.

INTRODUCTION

Electronic learning (also called "e-Learning" or "eLearning") generally refers to education or learning where users (e.g., learners, instructors, administrative staff) engage in education related activities using computers and other computing devices. For example, learners may enroll or participate in a course or program of study offered by an educational institution (e.g., a college, university or grade school) through a web interface that is accessible over the Internet. Similarly, learners may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g., studying an electronic textbook, or watching a recorded or live webcast of a lecture) that is not associated with a particular institution or organization.

Electronic learning often occurs without any physical interaction between the users in the educational community. Accordingly, electronic learning overcomes some of the geographic limitations associated with more traditional learning methods, and may eliminate or greatly reduce travel and relocation requirements imposed on users of educational services.

Furthermore, because learning resources can be offered and consumed electronically, there are fewer physical restrictions on learning. For example, the number of learners that can be enrolled in a particular course may be practically limitless, as there may be no requirement for physical facilities to house the learners during lectures. Electronic learning resources may include various learning materials associated with a course. For example, the electronic learning resources may include traditional print learning material such as text books and assignments. The electronic learning resources may also other media such as video and audio based resources.

In addition to the electronic learning resources, information about the electronic learning resources, which may be referred to as "metadata" for the learning resources may also be captured. Metadata associated with a learning resource may allow more efficient organization of the resource and may improve searchability and usability. Generally, it is desirable to generate high quality metadata associated with the resources. However, generating high quality metadata may be challenging for a number of reasons. For example, it may be difficult to capture the right type of information about a learning resource. In another example, it may be too onerous for a user to manually generate the metadata.

The above information is presented as background information only to assist with an understanding of the present disclosure. No determination has been made, and no assertion is made, as to whether any of the above might be applicable as prior art with regard to the present application.

SUMMARY

According to one aspect, a system for generating metadata for at least one learning resource. The system may include at least one data storage device storing a plurality of predefined metadata templates, each of the metadata templates having a plurality of metadata fields, and at least one processor in data communication with the at least one data storage device. The at least one processor is operably configured to receive the at least one learning resource, the at least one learning resource including an electronic file having a learning resource type and content data, select a metadata template from the predefined metadata templates based upon the learning resource type of the at least one learning resource, determine a topic associated with the learning resource, and customize the selected metadata template by adding one or more predefined metadata fields associated with the topic of the learning resource, the customized metadata template including learning resource metadata fields indicative of the topic of the learning resource.

In some aspects, the topic associated with the learning resource may be determined from the context of the learning resource within an electronic learning system. The context of the learning resource may include a location of the learning resource in an organization topology of the learning system. The context of the learning resource may include the user profile providing the learning resource.

In some aspects, the topic associated with the learning resource is determined based upon semantic analysis of the content data of the electronic file of the learning resource.

In some cases, the at least one processor may be further configured to populate the metadata fields of the customized metadata data template. The metadata fields may be populated based upon the textual information associated with the content data of the electronic file of the learning resource. The textual information may be processed via a natural language processor to determine a plurality of keywords associated with the learning resource. The keywords associated with the learning resource may be contrasted with a predefined collection of keywords associated with the topic of the learning resource to determine suitable keywords to populate the metadata fields.

In some aspects, the at least one processor is further configured to determine whether there is an older version of the learning resource, and when there is an older version of the learning resource, obtain an old metadata record associated with the older version of the learning resource and then use the old metadata record to populate the new metadata record.

According to another aspect, a computer implemented method for generating metadata for at least one learning resource. The method may include receiving the at least one learning resource, the at least one learning resource including an electronic file having a learning resource type and content data, selecting a metadata template from a plurality of predefined metadata templates based upon the learning resource type of the at least one learning resource, each of the metadata templates having a plurality of metadata fields, determining a topic associated with the learning resource, and customizing the selected metadata template by adding one or more predefined metadata fields associated with the topic of the learning resource, the customized metadata template including learning resource metadata fields indicative of the topic of the learning resource.

In some cases, the topic associated with the learning resource is determined from the context of the learning resource within an electronic learning system. The context of the learning resource may include a location of the learning resource in an organization topology of the learning system. The context of the learning resource may include the user profile providing the learning resource. The method may further include determining the topic associated with the learning resource based upon semantic analysis of the content data of the electronic file of the learning resource.

In some cases, the method may further include populating the metadata fields of the customized metadata data template. The metadata fields may be populated based upon the textual information associated with the content data of the electronic file of the learning resource.

The method may further include processing the textual information via a natural language processor to determine a plurality of keywords associated with the learning resource. The keywords associated with the learning resource may be contrasted with a predefined collection of keywords associated with the topic of the learning resource to determine suitable keywords to populate the metadata fields.

The method may further include determining whether there is an older version of the learning resource, and when there is an older version of the learning resource, obtaining an old metadata record associated with the older version of the learning resource and populating the metadata fields based upon the old metadata record.

BRIEF DESCRIPTION OF THE DRAWINGS

Some embodiments will now be described, by way of example only, with reference to the following drawings, in which.

DESCRIPTION OF SOME EMBODIMENTS

Figure 1:
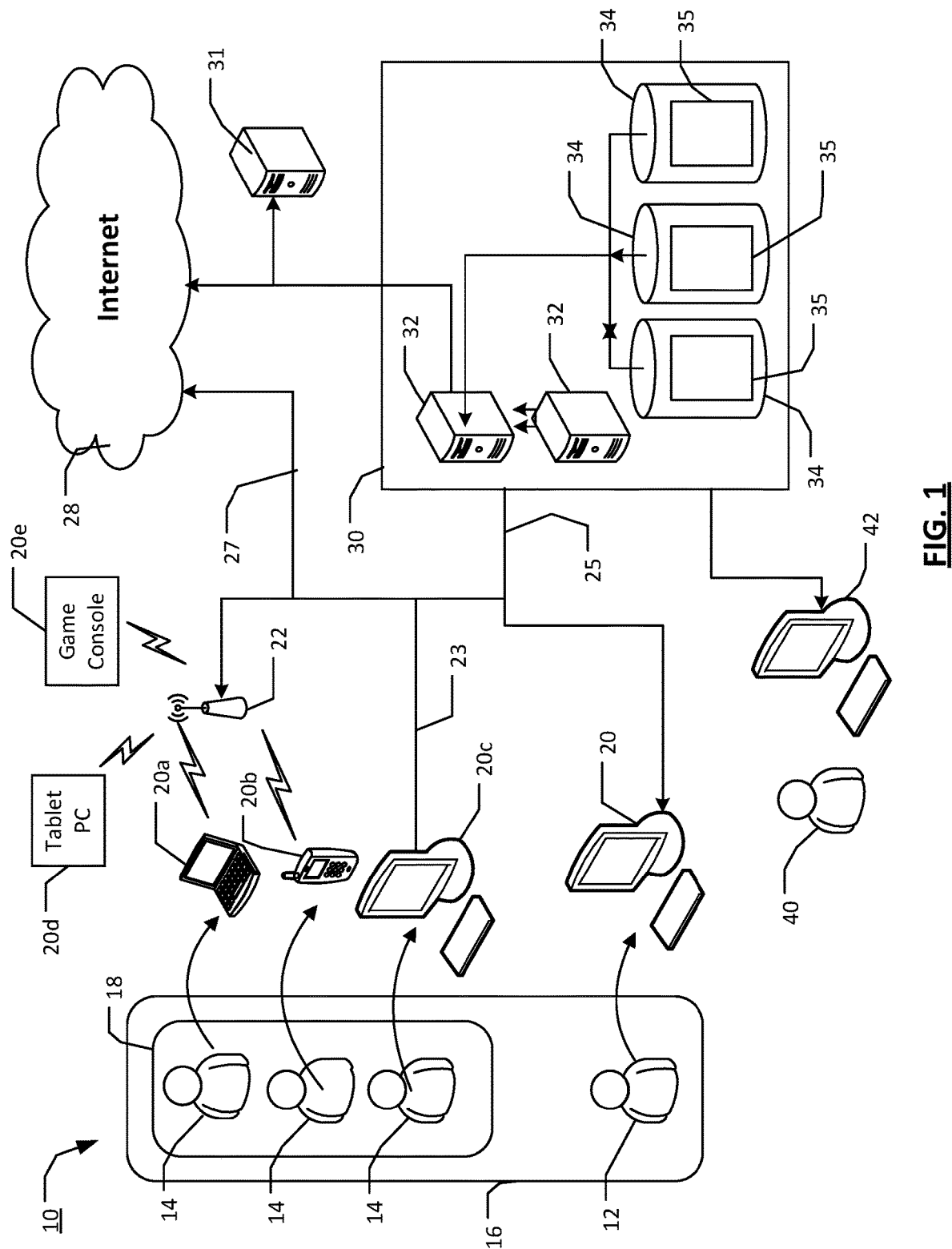
FIG. 1 is a schematic diagram illustrating an eLearning system according to some embodiments.

Various embodiments of the systems and methods described herein may be implemented in hardware or software, or a combination of both, depending on the appropriate configuration. Some embodiments may be implemented in computer programs executing on programmable computers, each computer including at least one processor, a data storage system (including for example volatile memory or non-volatile memory or other data storage elements or a combination thereof), and at least one communication interface.

Program code may be applied to input data to perform one or more functions as described herein and to generate output information. The output information may be applied to one or more output devices in known fashions.

In some cases, each program may be implemented in a high level procedural or object oriented programming or scripting language, or both, to communicate with a computer system. Alternatively the programs may be implemented in assembly or machine language, if desired. The language could be a compiled or interpreted language.

Each such computer program may be stored on a storage media or a device (e.g., ROM, magnetic disk, optical disc), readable by a general or special purpose programmable computer, for configuring and operating the computer when the storage media or device is read by the computer to perform the procedures described herein.

Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments may be capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like.

Non-transitory computer-readable media generally comprises all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described or claimed herein in any way, but rather as merely describing the implementation of the various embodiments described herein.

Referring now to FIG. 1, illustrated therein is an electronic learning ("eLearning") system 10 according to some embodiments.

Using the system 10, one or more individuals 12, 14 may communicate with an educational service provider 30 to participate in, provide, and/or consume electronic learning services. In some embodiments, the educational service provider 30 may be part of or associated with a traditional "bricks and mortar" educational institution (e.g., a grade school, university or college), another entity that provides educational services (e.g., an online university, a company that specializes in offering training courses, or an organization that has a training department), or may be an independent service provider (e.g., for providing individual electronic learning).

It should be understood that a course is not limited to formal courses offered by formal educational institutions. The course may include any form of learning instruction offered by an entity of any type. For example, the course may be a training seminar at a company for a small group of employees or a professional certification program with a larger number of intended participants (e.g., PMP, CMA, etc.).

In some embodiments, one or more educational groups can be defined that include one or more of the individuals 12, 14. For example, as shown in FIG. 1, the individuals 12, 14 may be grouped together in an educational group 16 representative of a particular course (e.g., History 101, French 254), with a first individual 12 or "instructor" or "user" being responsible for providing the course (e.g., organizing lectures, preparing assignments, creating educational content etc.), while the other individuals 14 or "participants" are consumers of the course content (e.g., individuals 14 are enrolled in the course, for example "students").

In some examples, the individuals 12, 14 may be associated with more than one educational group (e.g., the users 14 may be enrolled in more than one course as participants, the first individual may be enrolled in at least one course as an participant while being responsible for teaching at least one other course as a user, or the first individual 12 may be responsible for teaching more than one courses as a user).

In some embodiments, educational sub-groups may also be formed. For example, two of the individuals 14 are shown as part of educational sub-group 18. The sub-group 18 may be formed in relation to a particular project or assignment (e.g., sub-group 18 may be a lab group) or based on other criteria. In some embodiments, due to the nature of the electronic learning, the individuals 14 in a particular sub-group 18 need not physically meet, but may collaborate together using various tools provided by the educational service provider 30.

In some embodiments, other groups 16 and sub-groups 18 could include individuals 14 that share common interests (e.g., interests in a particular sport), that participate in common activities (e.g., members of a choir or a club), and/or have similar attributes (e.g., individuals that are male, and/or under twenty-one years of age, etc.).

Communication between the individuals 12, 14 and the educational service provider 30 can occur either directly or indirectly using any suitable computing device. For example, the individual 12 may use a computing device 20 such as a desktop computer that has at least one input device (e.g., a keyboard and a mouse) and at least one output device (e.g., a display screen and speakers).

The computing device 20 can generally be any suitable device for facilitating communication between the individual 12, 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, a terminal 20c, a tablet computer 20d, or a game console 20e over a wired connection 23.

The computing devices 20 may be connected to the service provider 30 via any suitable communications channel. For example, the computing devices 20 may communicate to the educational service provider 30 over a local area network (LAN) or intranet, or using an external network (e.g., by using a browser on the computing device 20 to browse to one or more web pages presented over the Internet 28 over a data connection 27).

In some examples, one or more of the individuals 12, 14 may be required to authenticate their identities in order to communicate with the educational service provider 30. For example, the individuals 12, 14 may be required to input a login name and/or a password or otherwise identify themselves to gain access to the system 10.

In some examples, one or more individuals (e.g., "guest" users or participants) may be able to access the system without authentication. Such guests may be provided with limited access, such as the ability to review one or more components of the course, for example, to decide whether they would like to participate in the course.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one individual 14 may use a laptop 20a to browse to a webpage that displays elements of an electronic learning system (e.g., a course page).

The educational service provider 30 generally includes a number of functional components for facilitating the provision of social electronic learning services. For example, the educational service provider 30 generally includes one or more processing devices 32 (e.g., servers 32), each having one or more processors. The processing devices 32 are configured to send information (e.g., HTML or other data) to be displayed on one or more computing devices 20 in association with the social electronic learning system 10 (e.g., course information). In some embodiments, a processing device 32 may be a computing device 20 (e.g., a laptop or personal computer).

The educational service provider 30 also generally includes one or more data storage devices 34 (e.g., memory, etc.) that are in communication with the processing devices 32, and could include a relational database (such as a Structured Query Language (SQL) database), or other suitable data storage devices. The data storage devices 34 are configured to host data 35 about the courses offered by the service provider (e.g., the course frameworks, educational materials to be consumed by the individuals 14, records of assessments done by individuals 14, etc.).

The data storage devices 34 may also store authorization criteria that define what actions may be taken by the individuals 12, 14. In some embodiments, the authorization criteria may include at least one security profile associated with at least one role. For example, one role could be defined for individuals who are primarily users responsible for developing an educational course, teaching it, and assessing work product from participants for that course. Users with such a role may have a security profile that allows them to configure various components of the course, post assignments, add assessments, evaluate performance, and so on.

In some embodiments, some of the authorization criteria may be defined by specific individuals 40 who may or may not be part of the educational community 16. For example, individuals 40 may be permitted to administer and/or define global configuration profiles for the system 10, define roles within the system 10, set security profiles associated with the roles, and assign the roles to particular individuals 12, 14 in the system 10. In some embodiments, the individuals 40 may use another computing device (e.g., a desktop computer 42) to accomplish these tasks.

The data storage devices 34 may also be configured to store other information, such as personal information about the individuals 12, 14 of the system 10, information about which courses the individuals 14 are enrolled in, roles to which the individuals 12, 14 are assigned, particular interests of the individuals 12, 14 and so on.

The processing devices 32 and data storage devices 34 may also provide other electronic learning management tools (e.g., allowing individuals to add and drop courses, communicate with other individuals using chat software, etc.), and/or may be in communication with one or more other vendors that provide the tools.

In some embodiments, the system 10 may also have one or more backup servers 31 that may duplicate some or all of the data 35 stored on the data storage devices 34. The backup servers 31 may be desirable for disaster recovery (e.g., to prevent undesired data loss in the event of an event such as a fire, flooding, or theft).

In some embodiments, the backup servers 31 may be directly connected to the educational service provider 30 but located within the system 10 at a different physical location. For example, the backup servers 31 could be located at a remote storage location at a distance from the service provider 30, and the service provider 30 could connect to the backup server 31 using a secure communications protocol to ensure that the confidentiality of the data 35 is maintained.

Figure 2:
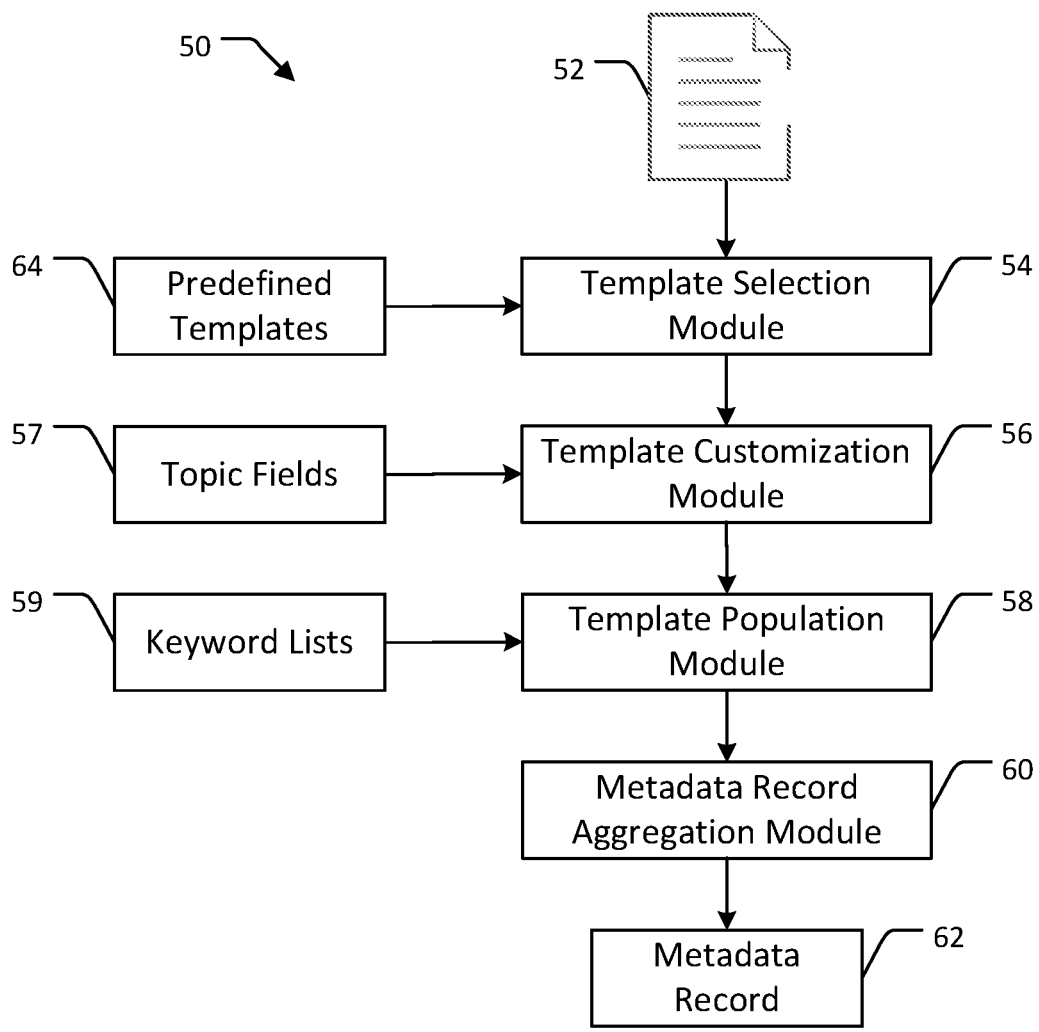
FIG. 2 is a schematic diagram of modules for generating metadata for learning resources that may be provided by one or more processors of the system shown in FIG. 1.

Referring now to FIG. 2, illustrated therein is a schematic diagram illustrating modules 50 configured to generate learning resource metadata for learning resources that are generated or provided to the system 10. The modules 50 may be provided by one or more processors of the system 10. For example, processors of the servers 32 and/or the computing devices 20 may be configured to provide the modules. It should be understood that these modules are provided for exemplary purposes only. In other embodiments, it may be possible to implement the functionality of the system by varying and/or omitting one or more modules, or without any specific modules.

Learning resources 52 may be provided by one or more users of the system 10, such as an instructor, a learner, an administrator or any other suitable user. For example, an instructor of a course may upload various learning resources 52 to the system 10 for consumption by learners in the course. Similarly, the learners in a course may upload a learning resource 52 to share with other learners and/or the instructor of the course.

The electronic learning resources 52 may include electronic files that can be processed by suitable applications to provide various learning materials. Learning materials may include various learning materials such as textbooks, academic articles, publications, assessments, audio/visual materials and/or other materials that could facilitate learning. The learning resources may also include other items, for example an assessment, which might exist only as one or more rows in a relational database, for example, and not as a file.

The learning resource 52 may include multiple files. For example, if a learning resource 52 is a chapter with three components, there may be different files for each of the components.

The learning resources 52 may be provided in association with a course. For example, an instructor may upload a learning resource to a course. However, in some cases, the learning resources 52 may not be associated with a particular course. For example, a learning resource 52 directed to becoming a more effective writer may be provided generally as it may be useful for various learners regardless of their study.

Figure 3:
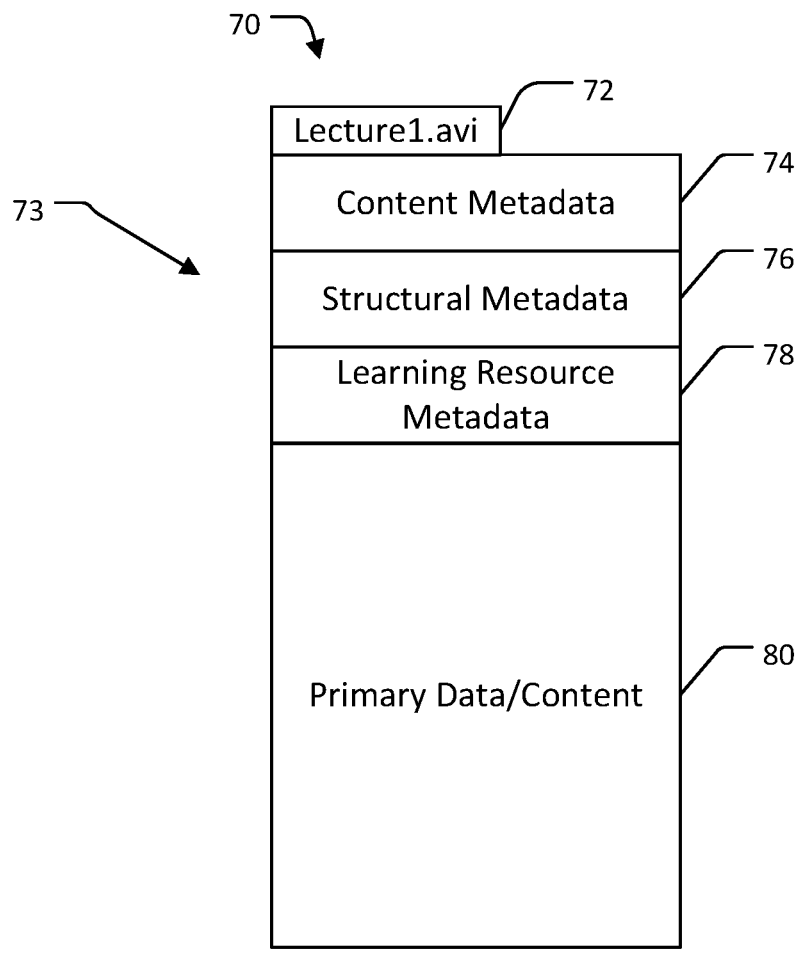
FIG. 3 is a schematic diagram of an exemplary learning resource and associated metadata that may be provided by the modules shown in FIG. 2.

Referring now to FIG. 3, illustrated therein is an exemplary learning resource 70. The learning resource 70 includes a name 72, which in this case is "lecture1.avi".

The learning resource 72 also includes primary data 80. The primary data 80 includes information that could be processed by a suitable program to provide the learning materials. For example, if the learning material is a video, then the primary data may include video data that could be played back by a suitable video player application. In some cases, the primary data might include various combinations of documents, audio resources, video resources and images.

The primary data 80 has a format based upon the type of data being provided. For example, the primary data may include data associated with a document, which may be provided as one or more electronic files in .txt, .doc, .pdf or any other suitable formats. In another example, the primary data may include audio files. The audio files may be provided as electronic files in .wav, .mp3 or any other suitable format. The primary data 80 may also include data associated with one or more video recordings. The video recordings might be provided as electronic files in .mpeg, .avi, .mov, or any other suitable format.

In addition to the primary data 80, the learning resource also includes metadata 73. The metadata 73 may refer to information that is stored in the file container in addition to the primary data 80. Generally, the metadata 73 may include different types of metadata. In the example, as shown, the metadata 73 includes content metadata 74, structural metadata 76, and learning resource metadata 78.

It should be understood that the metadata associated with a learning resource may vary. For example, there may not be any content metadata and/or structural metadata associated with some learning resources.

Generally, the type of metadata 73 associated with a learning resource 70 would depend on the format of the primary data 80. That is, different types of learning resources may have different types of metadata associated therewith. For example, metadata for a text document may be different from metadata for a video file.

The structural metadata 76 that includes structural information about the learning resource such as information about the design and specification of data structures. This may be referred to as "data about the containers of data".

In contrast, the content metadata 74 may include descriptive information about the content of the learning resource such as information about individual instances of the primary data. The metadata for a video file, for example, may include structural information such as the format of the video and content information such as the length of the video, author information, copyright information.

In addition to the content metadata and/or the structural metadata that may be available generally based upon formats of various learning resources 52, the modules 50 may facilitate generation of context-specific metadata. For example, in the eLearning system 10 generally described above, the modules 50 may facilitate learning resource metadata 78 as described hereinbelow. The learning resource metadata 78 includes metadata that includes information directed to the learning materials provided by the learning resource 70.

The learning resource metadata 78 may be generated using the modules 50 shown in FIG. 2 according to some embodiments. The modules 50 include a template selection module 54, a template customization module 56, a template population module 58, and a metadata record aggregation module 60.

The template selection module 54. The template selection module 54 selects a suitable template based upon the learning resource type (e.g., file type, etc.) of the learning resource 52. As noted above, the learning resource 52 may be of different types (e.g., text, image, video, link, etc.). A suitable template may be selected from a plurality of predefined templates 64. There may be many predefined templates 64 that are provided for different types of file types.

Figure 4:
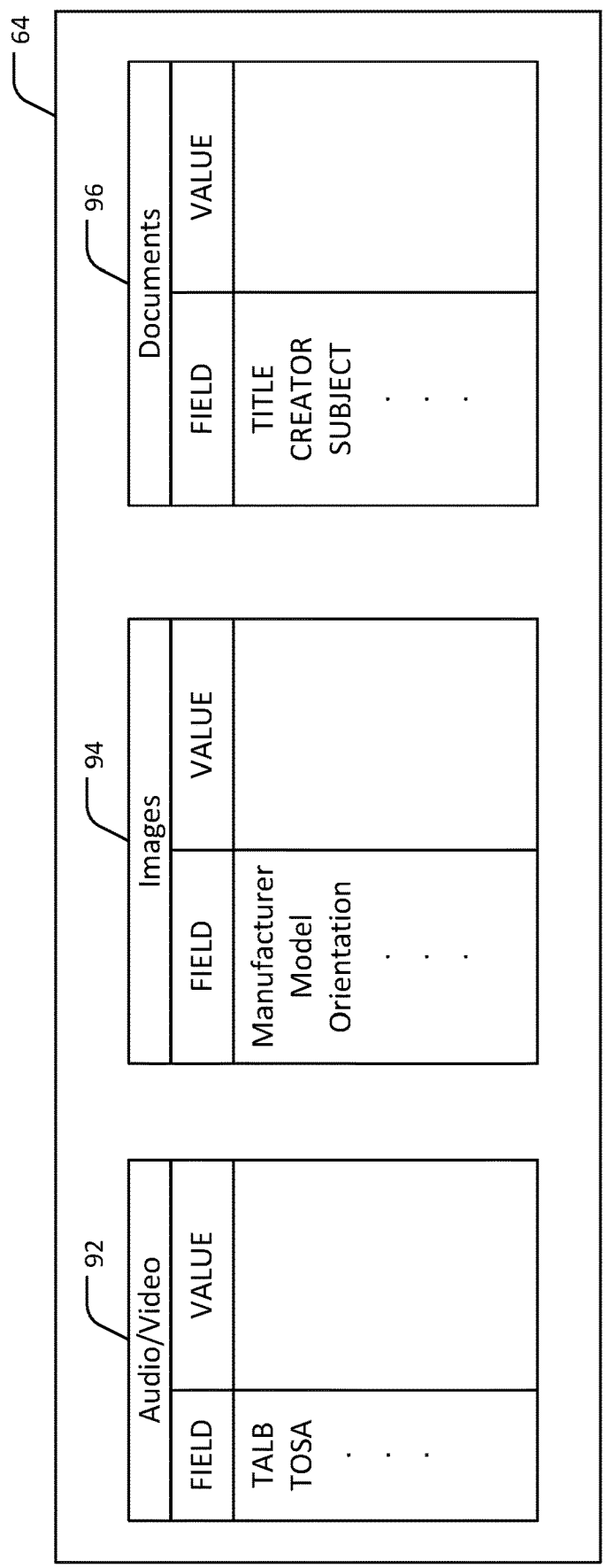
FIG. 4 is a schematic diagram of predefined metadata templates shown in FIG. 2.

Referring now to FIG. 4, illustrated therein are exemplary predefined templates 64 that are available to the template selection module 54. In the example as shown, the templates 64 include an audio/video template 92 for use with learning resources that are either audio or video templates. The template 92, for example, may be based upon the ID3V2 tag that is commonly used for the MP3 audio file format. In other examples, the template 92 may be based upon other metadata containers and/or different templates may be used for audio files and video files.

The templates 64 also include an image template 94 which may be applied when the learning resource is an image. The image template 94, for example, may be based upon the Exchangeable image file format ("Exif") standard or any other suitable format.

The templates 64 also include a document template 96. The document template 96 may be applied to learning resources that include documents in various formats. For example, the document template 96 may be applied to Microsoft Office™ documents, Adobe™ pdf documents, HTML pages, text-based resources, and the like. The document template 96 may also be applied to learning resources that are of unknown type or learning resources that are not suitable for other templates 64. The document template 96 may be based upon a standard Learning Object metadata format, such as Dublin Core, or IEEE LOM.

As shown, the templates 64 include the audio/video template 92, the image template 94 and the document template 96. In other embodiments, the number and the format of the templates may vary.

Referring back to FIG. 2, after one of the templates 64 has been selected by the template selection module 54, the selected template is then modified by the template customization module 56. The template customization module 56 is configured to modify the selected template by adding (or subtracting) metadata fields based upon a topic (i.e. subject of learning) associated with the learning resource 52. The topic of the learning resource 52 could be determined based upon the content of the learning resource 52 or the context surrounding the learning resource 52.

The context of the learning resource 52 refers to information that can be obtained outside the learning resource 52 itself such as the location of the learning resource, the user providing the learning resource, and so on.

The content of the learning resource 52 refers to the information that can be obtained within the learning resource 52.

The template customization module 56, for example may determine the topic associated with the learning resource 52 based upon the location of the learning resource in the larger organization topology. For example, the learning resource 52 is uploaded in association with a particular department (e.g., mathematics), then it could be inferred from this association that the learning resource is related to mathematics.

In some cases, the topic of the learning resource 52 may be determined based upon the user profile providing the learning resource 52. For example, if an instructor who teaches a mathematics class is uploading the learning resource 52, then it could be inferred that the learning resource 52 is related to mathematics.

In some cases, the topic of the learning resource 52 may be determined based upon semantic analysis of the content of the learning resource. For example, if the learning resource 52 is a document, then a semantic analysis of the content may be conducted to determine the topic of the learning resource 52.

After a topic of the learning resource 52 has been determined, the template customization module 56 is configured to add (or remove) metadata fields based upon the topic detected.

Figure 5:
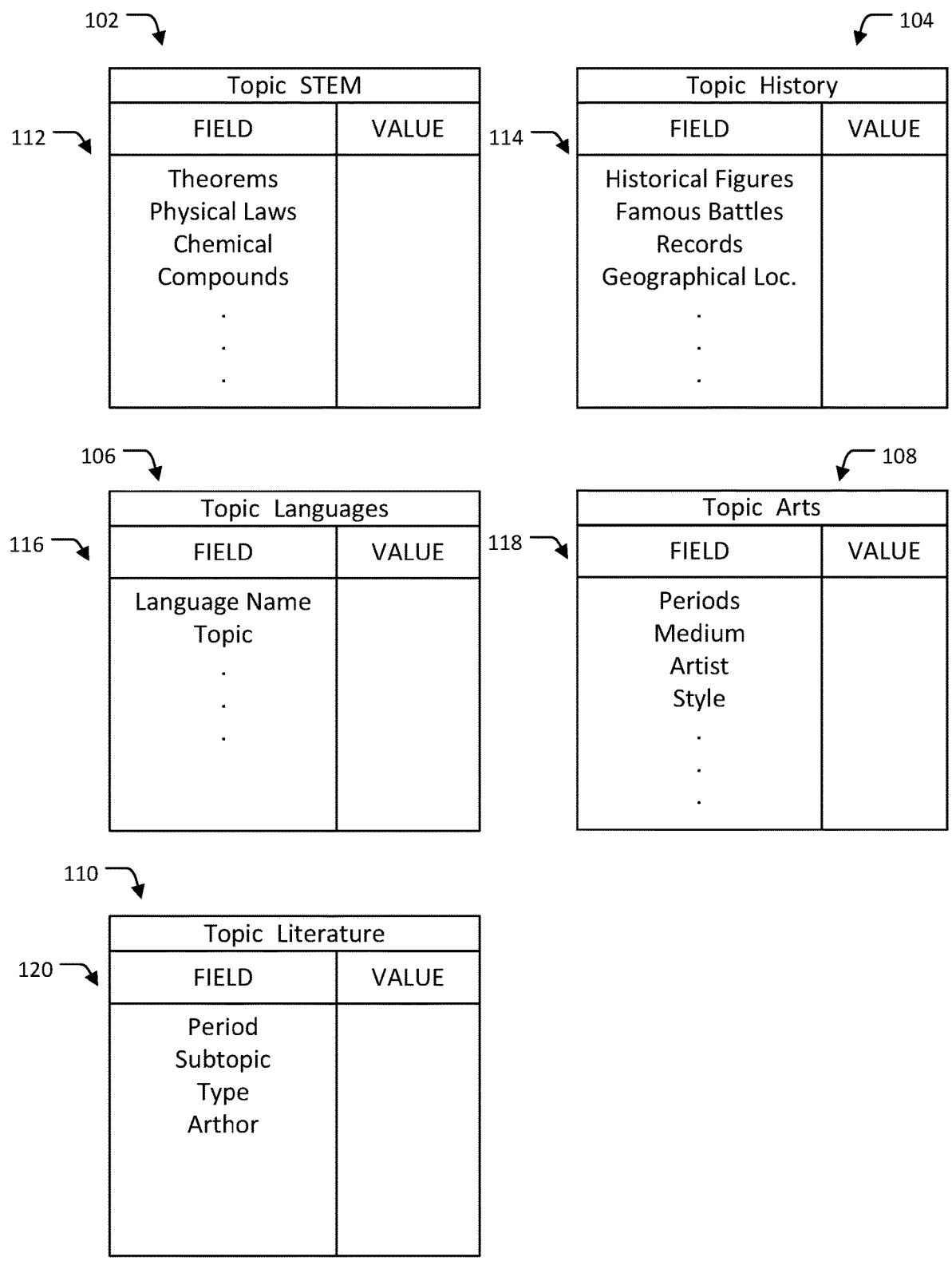
FIG. 5 is a schematic diagram of exemplary topics and associated metadata fields shown in FIG. 2.

The template customization module 56 may have access to a plurality of topics and associated fields 57. Referring now to FIG. 5, illustrated therein is a number of exemplary topics and metadata fields 57 that may be provided to the template customization module 56.

The exemplary topics include STEM (Science, Technology, Engineering and Mathematics) topic 102, History topic 104, Languages topic 106, Arts topic 108, and Literature topic 110. It should be understood that in other embodiments, various combination and configuration of topics may be provided.

Each of the topics has one or more fields associated therewith. As shown, the STEM topic 102 has a plurality of fields 112. The fields 112, for example, may include a field entitled "Theorems" for theorem names related to the learning resource 52. The fields 112, in another example may include physical laws or groups of chemical compounds (e.g., hydrocarbons, acids, radioactive elements, etc.). The fields 112, for example electrical engineering subject, may include a field entitled "Components" for components that can be used to build electrical circuits such as transistors, diodes, transformers, and the like.

If the learning resource 52 is related to History topic 104, then the metadata template for the learning resource 52, for example, may include fields 114 for historical periods, geographical locations, historical figures, famous battles, and so on.

If the learning resource 52 is related to Languages topic 106, then the metadata template for the learning resource 52, for example, may include fields 116 for language name, topics (e.g. grammar, vocabulary, etc.) conversational situations, conjugated verbs, and/or other suitable fields.

If the learning resource 52 is related to Arts topic 108, then the metadata template for the learning resource 52, for example, may include fields for period, medium, style, artist and the like.

If the learning resource 52 is related to Literature topic 110, then the metadata template for the learning resource 52, for example, may include fields 120 for period, sub topic, type, author and the like.

It should be understood that the above fields for various topics described herein above are for exemplary purposes only. In other embodiments, there may be different fields available. The fields for various topics may be generated based upon input from instructors, administrators or other suitable users.

After the template customization module 56 has customized the selected metadata template by adding or removing appropriate metadata fields based upon the detected topic, the customized metadata template is populated. One challenge in obtaining high quality metadata is to ensure that metadata fields are populated with appropriate information. In many conventional systems, metadata fields may be populated manually by one or more users. However, manual population of the metadata fields may require time and effort, which may in turn discourage users from manually populating the fields.

The system 10 as described herein generally automates the population the metadata fields such that the need for the users to manually provide input to the metadata fields is reduced or eliminated. Increasing the automation of metadata field population reduces the need for manual inputs, which may encourage higher quality metadata being captured.

Referring back to FIG. 2, the template population module 58 is configured to automatically fully or partially populate one or more fields of the customized metadata templates generated by the template customization module 56. The template population module 58 may be configured to execute various template population routines based upon the field being populated.

In some cases, the template population module 58 may be configured to obtain information to populate the metadata fields from the content of the resource. For example, if the learning resource 52 include textual information, tag parsers, such as for ID3 (mp3), Exif (jpg, way), docx (Office) could be employed. When the learning resource 52 include video files, then the closed captioning and/or subtitle information, when available, can be analysed.

In some cases, the template population module 58 may be configured to obtain keywords from frequent, non-trivial words, for example by executing a natural language processor such as Apache OpenNLP on the text associated with the learning resource 52.

In some cases, the template population module 58 may be configured to conduct Optical Character Recognition (OCR) to extract textual information from the learning resource 52. For example, if the learning resource 52 is an image or a PDF document, then the template population module 58 may conduct OCR based upon the learning resource to obtain the textual information of the learning resource. The textual information may then be further processed to populate the metadata fields.

In some embodiments, the template population module may be configured to conduct one or more topic-specific metadata field population methods to populate metadata fields associated with particular topics.

For example, if the template population module 58 may have access to a plurality of keywords associated with a particular topic. For example, for mathematics topic, the module 58 may have access to a collection of keywords that are mathematical theorem names. Similarly, if the topic is physics, the module 58 may have access to a collection of keywords that are physical laws. If the topic is chemistry, the collection of keywords may be chemistry groups of compounds (e.g., hydrocarbons, acids, radioactive elements). If the topic is history, the keywords may include a collection of historical figures, battles, and so on. If the topic is Arts, the collection of keywords may include names of famous artists, painters, sculptors, performance artist and the like. If the topic is literature, then the keywords may include names of literary figures or famous literary works.

The template population module 58 may cross reference the collection of keywords with the content of the learning resource 52 to determine whether one or more of the keywords are applicable to the learning resource 52. If a keyword is deemed to be applicable, the keyword may be used to populate one or more of the topic specific metadata fields.

The template population module 58 may be configured to populate the metadata fields based upon learning system information associated with the learning resource 52. The module 58 may be configured to populate the metadata fields based upon the learning objectives and or competencies with the learning resource 52. For example, word set matching between pre-defined word sets (e.g., "integral", "derivative", etc.) and semi-frequent words within the learning resource 52 may be performed. A match may indicate that the resource belongs to a certain educational domain.

In another example, the metadata field population module 58 may be configured to populate the metadata fields based upon the user account details of the user providing the learning resource 52.

In another example, the metadata field population module 58 may be configured to replace pre-set replacement strings such as "#course-name #". Replacement strings may include course name, department name, current date, etc.

After the template population module 58 has populated one or more of the metadata fields, the populated metadata record is provided to the aggregation module 60. The aggregation module 60 determines whether the learning resource 52 is overwriting one or more older learning resources. For example, the learning resource 52 may be an update of an older learning resource. That is, an instructor may be providing the learning resource 52 to replace an existing older learning resource. In cases where there is an older learning resource associated with the learning resource 52 that is being provided, the metadata record from the older learning resource and the learning resource 52 may be combined.

The aggregation module 60 may be configured to provide one or more of the following options to the user to determine how the metadata records from the older and the present learning resource should be treated. In some cases, the options may be provided for each field of metadata and/or for the entire metadata record.

In the first option, the existing metadata record for the existing learning resource may overwrite the incoming metadata record for the learning resource 52. This may be used in situations when it is not necessary to update the metadata record (e.g., if the new learning resource 52 is a minor update of the existing metadata record).

In the second option, the incoming metadata record the learning resource 52 may overwrite the existing metadata record for the existing learning resource. This may be used in situations when it is desirable to generate a new metadata record (e.g., if the new learning resource 52 is a major update of the existing metadata record).

In the third option, the metadata records are merged with the priority given to incoming metadata record associated with the learning resource 52. For example, in case that a certain field F appears in both existing and incoming metadata, then the value of F from the incoming metadata may be used.

In the fourth option, the metadata records are merged with the priority given to existing metadata record associated with the existing learning resource that is being overwritten.

The aggregation module would act on the existing metadata record and the incoming metadata record in accordance with the merging options selected by the user and present to the user for review. The user may be presented with an option to manually override one or more of the fields of the metadata record.

After the user has accepted the metadata record, either as presented or after manually modifying one or more fields, the metadata record is saved in association with the learning resource 52.

Figure 6:
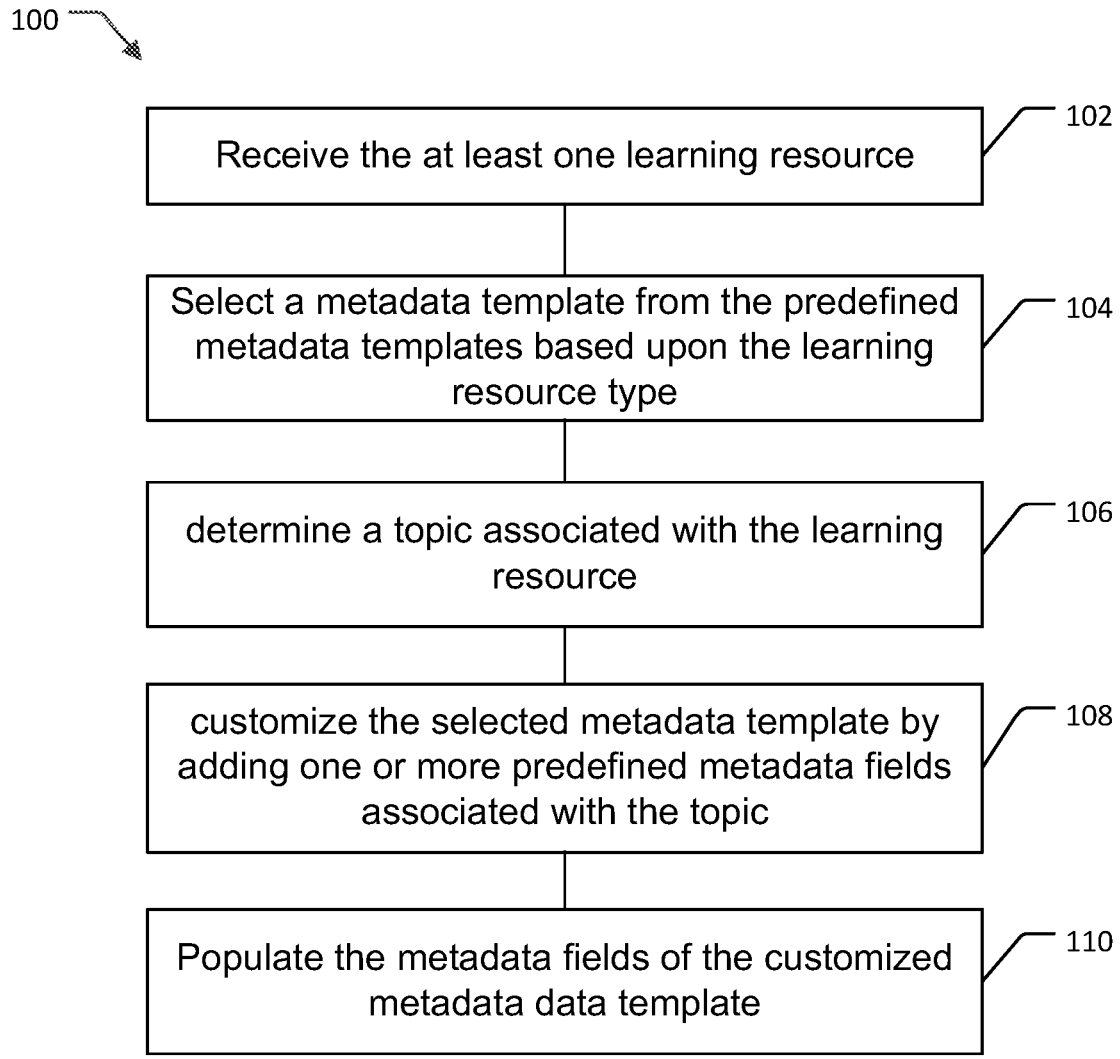
FIG. 6 is a schematic diagram of a method for generating metadata for learning resources according to some other embodiments.

Referring now to FIG. 6, illustrated therein is a method 100 for generating metadata for at least one learning resource according to some embodiments. The method 100 may be executed by one or more processors such as the processors of the system 10 described hereinabove.

The method begins at step 102, wherein the at least one learning resource is received. The at least one learning resource may include an electronic file having a learning resource type and content data.

At step 104, a metadata template from a plurality of predefined metadata templates is selected based upon the learning resource type of the at least one learning resource. Each of the metadata templates having a plurality of metadata fields.

At step 106, a topic associated with the learning resource is determined.

At step 108, the selected metadata template is customized by adding one or more predefined metadata fields associated with the topic of the learning resource.

At step 110, the metadata fields of the customized metadata data template is populated.

While the steps of the above methods have been described sequentially hereinabove, it should be noted that sequential performance of the steps may not need to occur for successful implementation of the method. As will be evident to one skilled in the art, rearranging sequence of performance of the steps, omitting the performance of some steps, or performing the steps in parallel may be possible without abandoning the essence of the invention.

While certain features have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for generating metadata for at least one learning resource, the system comprising:
  (a) at least one data storage device storing a plurality of predefined metadata templates, each of the metadata templates having a plurality of metadata fields; and
  (b) at least one processor in data communication with the at least one data storage device, the at least one processor configured to:
    (i) receive the at least one learning resource, the at least one learning resource including an electronic file having a learning resource type and content data,
    (ii) select a metadata template from the predefined metadata templates based upon the learning resource type of the at least one learning resource,
    (iii) determine a topic associated with the learning resource,
    (iv) customize the selected metadata template by adding one or more predefined metadata fields associated with the topic of the learning resource, the customized metadata template including learning resource metadata fields indicative of the topic of the learning resource, and
    (v) overwrite or combine existing metadata from one or more older learning resources with incoming metadata from the learning resource in the customized metadata template if new metadata is required.

2. The system of claim 1, wherein the topic associated with the learning resource is determined from the context of the learning resource within an electronic learning system.

3. The system of claim 2, wherein the context of the learning resource includes location of the learning resource in organization topology of the learning system.

4. The system of claim 2, wherein the context of the learning resource includes the user profile providing the learning resource.

5. The system of claim 1, wherein the topic associated with the learning resource is determined based upon semantic analysis of the content data of the electronic file of the learning resource.

6. The system of claim 1, wherein the at least one processor is further configured to populate the metadata fields of the customized metadata data template.

7. The system of claim 6, wherein the metadata fields are populated based upon the textual information associated with the content data of the electronic file of the learning resource.

8. The system of claim 7, wherein the textual information is processed via a natural language processor to determine a plurality of keywords associated with the learning resource.

9. The system of claim 8, wherein the keywords associated with the learning resource are contrasted with a predefined collection of keywords associated with the topic of the learning resource to determine suitable keywords to populate the metadata fields.

10. The system of claim 9, wherein the at least one processor is further configured to determine whether there is an older version of the learning resource, and when there is an older version of the learning resource, obtain an old metadata record associated with the older version of the learning resource and use the old metadata record to populate the new metadata record.

11. A computer implemented method for generating metadata for at least one learning resource, the method comprising:
  (a) receiving the at least one learning resource, the at least one learning resource including an electronic file having a learning resource type and content data;
  (b) selecting a metadata template from a plurality of predefined metadata templates based upon the learning resource type of the at least one learning resource, each of the metadata templates having a plurality of metadata fields;
  (c) determining a topic associated with the learning resource;
  (d) customizing the selected metadata template by adding one or more predefined metadata fields associated with the topic of the learning resource, the customized metadata template including learning resource metadata fields indicative of the topic of the learning resource; and
  (e) overwriting or combining existing metadata from one or more older learning resources with incoming metadata from the learning resource in the customized metadata template if new metadata is required.

12. The method of claim 11, wherein the topic associated with the learning resource is determined from the context of the learning resource within an electronic learning system.

13. The method of claim 12, wherein the context of the learning resource includes location of the learning resource in organization topology of the learning system.

14. The method of claim 12, wherein the context of the learning resource includes the user profile providing the learning resource.

15. The method of claim 11, wherein the topic associated with the learning resource is determined based upon semantic analysis of the content data of the electronic file of the learning resource.

16. The method of claim 11, further comprising populating the metadata fields of the customized metadata data template.

17. The method of claim 16, wherein the metadata fields are populated based upon the textual information associated with the content data of the electronic file of the learning resource.

18. The method of claim 17, wherein the textual information is processed via a natural language processor to determine a plurality of keywords associated with the learning resource.

19. The method of claim 18, wherein the keywords associated with the learning resource are contrasted with a predefined collection of keywords associated with the topic of the learning resource to determine suitable keywords to populate the metadata fields.

20. The method of claim 19, wherein the method further comprises determining whether there is an older version of the learning resource, and when there is an older version of the learning resource, obtaining an old metadata record associated with the older version of the learning resource and populating the metadata fields based upon the old metadata record.

* * * * *